United States Patent
den Besten (10) Patent No.: US 8,279,769 B2
(45) Date of Patent: Oct. 2, 2012

(54) MODE SWITCHING OF A DATA COMMUNICATIONS LINK

(75) Inventor: Gerrit W. den Besten, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 275 days.

(21) Appl. No.: 12/311,088

(22) PCT Filed: Sep. 14, 2007

(86) PCT No.: PCT/IB2007/053721
§ 371 (c)(1),
(2), (4) Date: Apr. 20, 2010

(87) PCT Pub. No.: WO2008/035262
PCT Pub. Date: Mar. 27, 2008

(65) Prior Publication Data
US 2010/0232304 A1    Sep. 16, 2010

(30) Foreign Application Priority Data
Sep. 18, 2006   (EP) .................................... 06120821

(51) Int. Cl.
*H04L 12/26*    (2006.01)

(52) U.S. Cl. ...................................................... 370/252
(58) Field of Classification Search .................. 370/252, 370/464–467
See application file for complete search history.

(56) References Cited

U.S. PATENT DOCUMENTS
6,700,403 B1    3/2004   Dillon
6,772,245 B1 *  8/2004   Pomerantz et al. ............. 710/60

OTHER PUBLICATIONS
International Search Report dated Apr. 24, 2008 in connection with PCT Patent Application No. PCT/2007/053721.
Written Opinion of the International Searching Authority dated Apr. 24, 2008 in connection with PCT Patent Application No. PCT/2007/053721.

* cited by examiner

Primary Examiner — Kerri Rose (57) ABSTRACT

A method and apparatus for determining a time-out period used for switching between a first operational mode and a second operational mode of a data communications link, comprising detecting a signal used to request switching from the first operational mode to the second operational mode; measuring the duration of the signal; and determining the time-out period in dependence on the measured duration of the signal.

20 Claims, 7 Drawing Sheets

MODE SWITCHING OF A DATA COMMUNICATIONS LINK

CROSS-REFERENCE TO RELATED APPLICATION(S)

The present application claims priority under 35 U.S.C. §365 to International Patent Application No. PCT/IB2007/053721 filed Sep. 14, 2007, entitled "IMPROVED MODE SWITCHING OF A DATA COMMUNICATION LINK". International Patent Application No. PCT/IB2007/053721 claims priority under 35 U.S.C. §365 and/or 35 U.S.C. §119(a) to European Patent Application No. 06120821.1 filed Sep. 18, 2006 and which are incorporated herein by reference into the present disclosure as if fully set forth herein.

The present invention relates to switching operation modes of a data communication link, in particular to a method, system and device for determining a suitable timeout to be used when switching from a first operation mode to a second operation mode.

For high-speed data transmission (differential) low-swing signalling via terminated lines is often the preferred solution. However, for the transfer of some control messages and/or smaller amounts of data, un-terminated operation without static power consumption, possibly at lower speed, can be advantageous.

The power consumption in stand-by mode can (only) become negligible if signal swings are large enough, so that the signal is easy to interpret, and if the line-voltages settle around one of the available supply or bias rail levels. This is easy to achieve with a rail-to-rail swing, low-speed, low-power mode.

Some standards, like the Mobile Industry Processor Interface (MIPI) D-PHY, combine multiple operation modes in one PHY to exploit optimally the advantages of different operation modes (LP and HS). However, during switch-over of operation modes, there may exist a limited period of time during which the line signals cannot be correctly interpreted by the receiver. Without special precautions, this can corrupt the communication. For this reason, a time-out mechanism is used for switching between operation modes, wherein the receiver is 'instructed' to ignore the line signals for a certain defined period of time.

In the example of D-PHY, the transition from HS towards LP mode is easier because the actual end of the time-out period can be observed reliably from the line states in that case. Therefore, the transition from LP to high speed (HS) transmission mode is most critical: namely, at the start of HS transmission.

In order to avoid unnecessary delay, it is preferable to keep the time-out period between the end of LP mode and the start of HS mode short. Unfortunately, determining an appropriate time-out period is complicated when the operation speeds of both modes (HS and LP) can vary over a large range.

Typically, a time-out based on a digital timer running on a clock signal with a known frequency is the chosen solution for many prior art timer-based implementations. As the HS transmission clock is available in source synchronous systems, and because that may be the only available clock in some cases, implementations tend to be based on that clock signal.

However, specifying a fixed number of HS clock cycles to determine the time-out period results in an excessively long time-out period for low HS clock speeds. For example, if the HS clock speed can vary between 80 MHz and 1 GHz, and if the time-out period must be 50 ns minimum, then the time-out period would vary from 50 ns (50/1G) at 1 GHz, up to 625 ns (50/80 M) at 80 MHz. Therefore, the receiver may wait for up to 575 ns longer than it is actually required to wait, which is wasteful of time.

An alternative is to determine the time-out using a programmable number of clock cycles, the number of cycles determined according to the current HS clock speed. However, there are disadvantages with this solution. Firstly, the receiver must know about the operation speed of the LP mode (or the timer programming value) before the time-out can be determined. For MIPI D-PHY, this can be solved because the operation speed can be communicated via the LP operation mode (LPDT). However, it then becomes difficult to change the speed on-the-fly, because this requires re-programming of the receiver timer. Re-programming of the receiver timer can be inconvenient, as it needs to be set and adapted via the higher layers in the protocol stack, which complicates speed changes, and tends to result in over-constrained PHY behaviour. In the case of MIPI D-PHY (or any other source synchronous PHY), this is an unwanted restriction as the flexibility of the momentary clock speed is one of the main advantages of source-synchronous communication. Additionally, the safety margin in the length of the time-out period would have to be rather large in order to accommodate the unintentional frequency variations that may occur during operation, due to distortion caused by measurement errors, implementation non-idealities in the data channel or circuitry, and momentary clock tolerances.

The system would become more flexible and more reliable if the PHYs were able to resolve the timer values autonomously.

It is, therefore, an object of the invention to improve on the known art.

According to a first aspect of the present invention there is provided a receiver for receiving a signal in at least a first operational mode and a second operational mode, the receiver comprising;

detecting means for detecting a request signal used to request switching from the first operational mode to the second operational mode;

measuring means for measuring the duration of the request signal;

determining means for determining a time-out period in dependence on the measured duration of the request signal; and waiting means for waiting the time-out period before the receiver operates in the second operational mode.

The inventor has realised that the duration of a request signal, which is used for requesting a change from one operation mode to another operation mode, can advantageously be used as a reference period for determining the length of the time-out period. The duration of the request signal can be easily measured in the receiver, and furthermore, the measurement can be performed at an optimum point in time, just before the actual time-out is needed.

Figure 3:
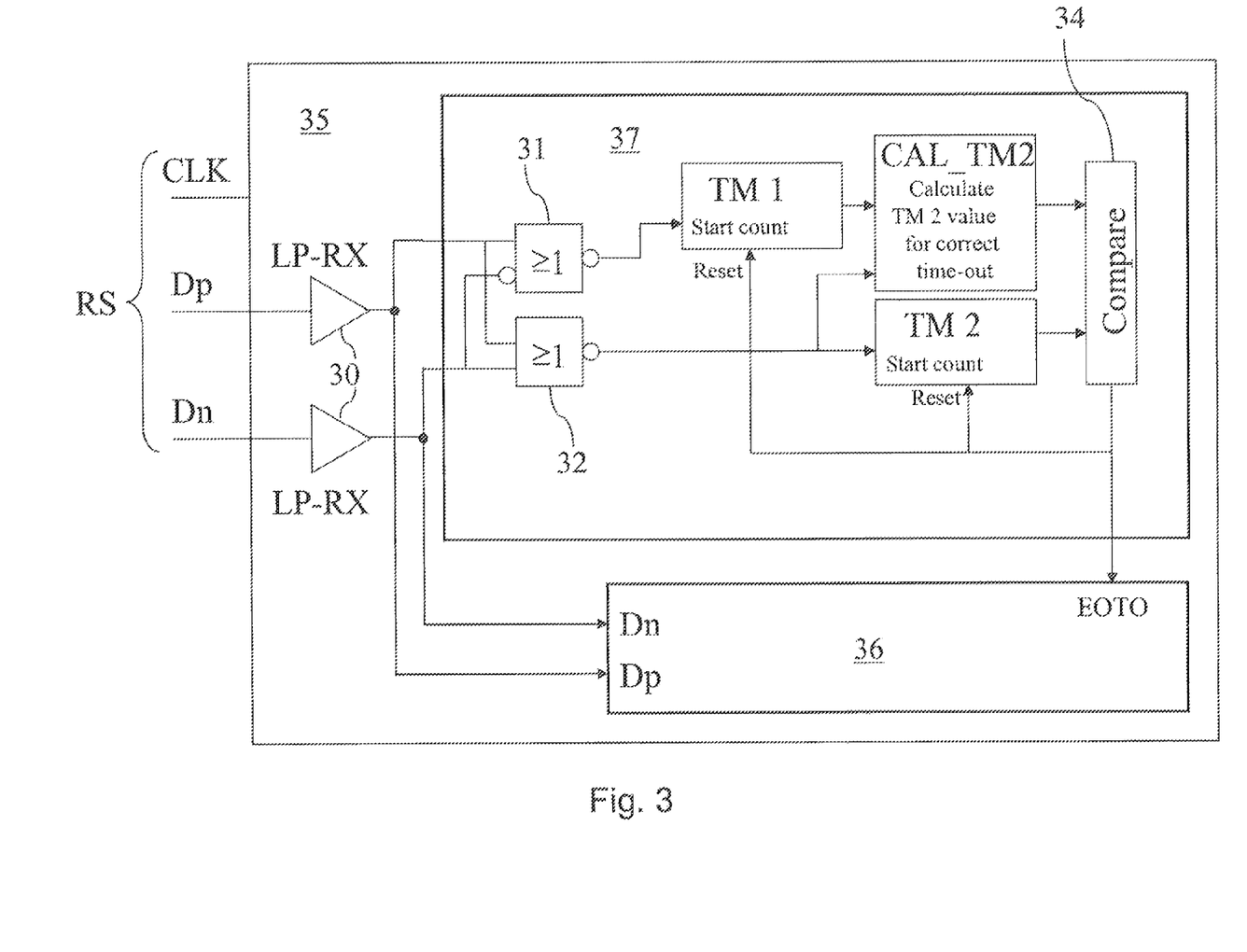
FIG. 3 shows a receiver including a digital implementation of the time-out mechanism applied for the MIPI D-PHY.
Figure 5:
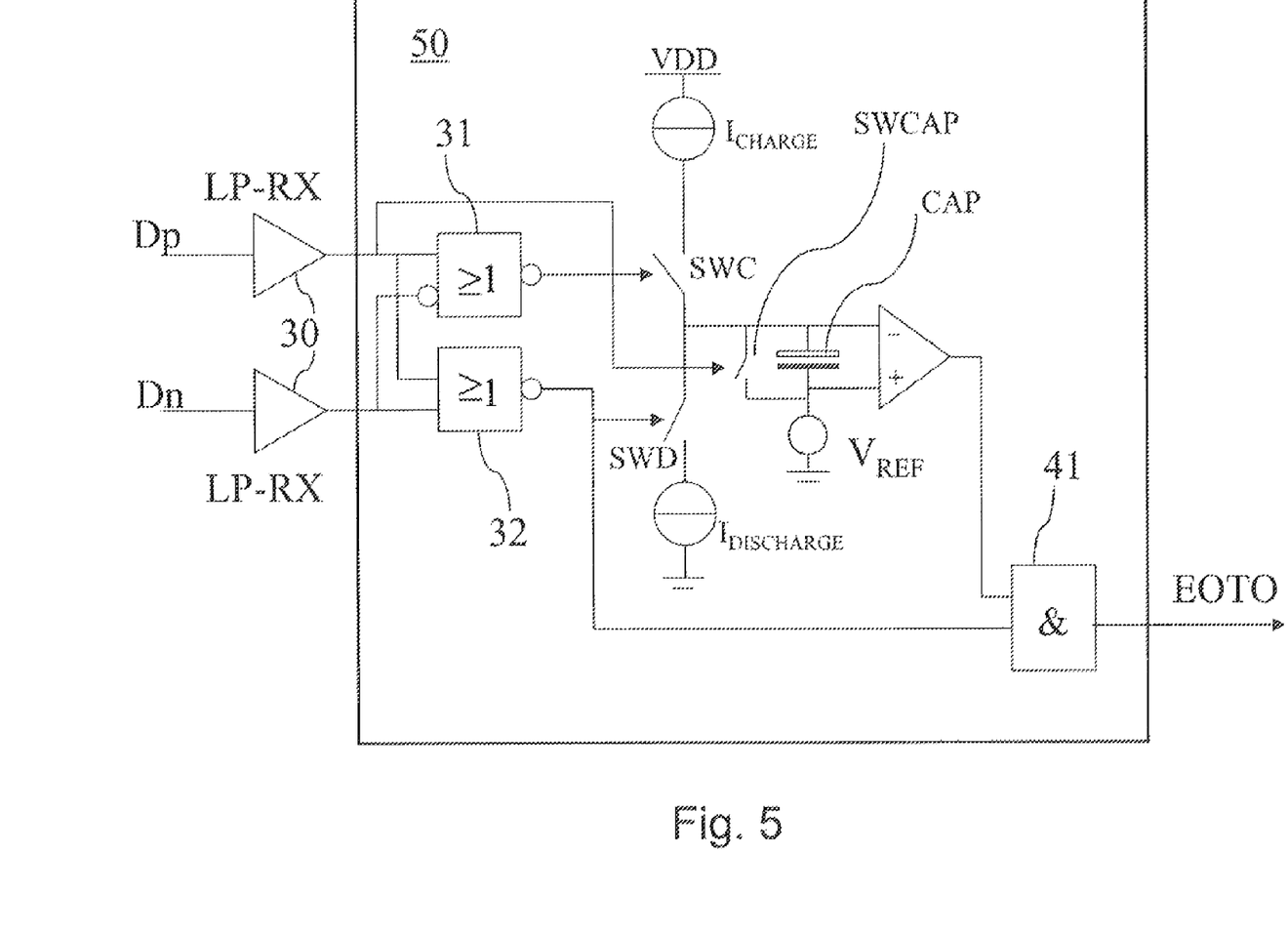
FIG. 5 shows an alternate analogue implementation of the time-out mechanism applied for the MIPI D-PHY and for use in the receiver of FIG. 3.

The length of the time-out period can be any function of the duration of the reference period. For example, the time-out period can be scaled with a factor and/or corrected with a fixed value compared to the reference period. The time-out may start immediately after the measured reference period, but can also start later, for example by triggering when the time-out should begin based on the occurrence of some other event. The measurement of the reference period can be done with a digital timer (for example, as shown in FIG. 3); or alternatively, an analogue implementation is possible (for example, as shown in FIG. 5).

Advantageously, the timer circuitry can be easily disabled (and powered down) during the periods of operation when the time-out period is not needed. Furthermore, the PHY can handle these time-outs autonomously, which simplifies the solution and avoids over-constraining the PHY by involving higher layers in the protocol stack.

An embodiment implemented with a digital timer requires a stable clock for running the digital timer during the change in operation mode. The clock may be the source clock (for example, the HS clock), although alternatively the clock may be any locally available clock. If the HS clock is used, then the HS transmission clock speed should be consistent during the change in operation mode, although if a local (or another provided) clock is used, then the HS transmission clock speed can be altered during the change in operation mode. The HS transmission clock speed can still be changed during all other periods of time.

An embodiment implemented using analogue timer circuitry does not require a stable clock, and so there are no restrictions on HS transmission clock speed changes at any time.

Compared to the time-out based on a programmable timer, the presented solution provides more flexibility, as it automatically scales with actual speed of LP and/or HS clocks without higher layer protocol involvement for the correct configuration.

According to a second aspect of the invention, there is provided a communication system adapted to operate in at least a first operational mode and a second operational mode, and comprising a transmitter and the receiver of the first aspect of the invention.

According to a third aspect of the invention, there is provided a method for determining a time-out period used for switching between a first operational mode and a second operational mode of a data communications link, the method comprising the steps of:
  detecting a request signal used to request switching from the first operational mode to the second operational mode;
  measuring the duration of the request signal; and
  determining the time-out period in dependence on the measured duration of the request signal.

Embodiments of the invention will now be described, by way of example, with reference to the accompanying drawings, in which.

Same or similar reference signs denote same or similar features. The Figures are not drawn to scale.

Figure 1:
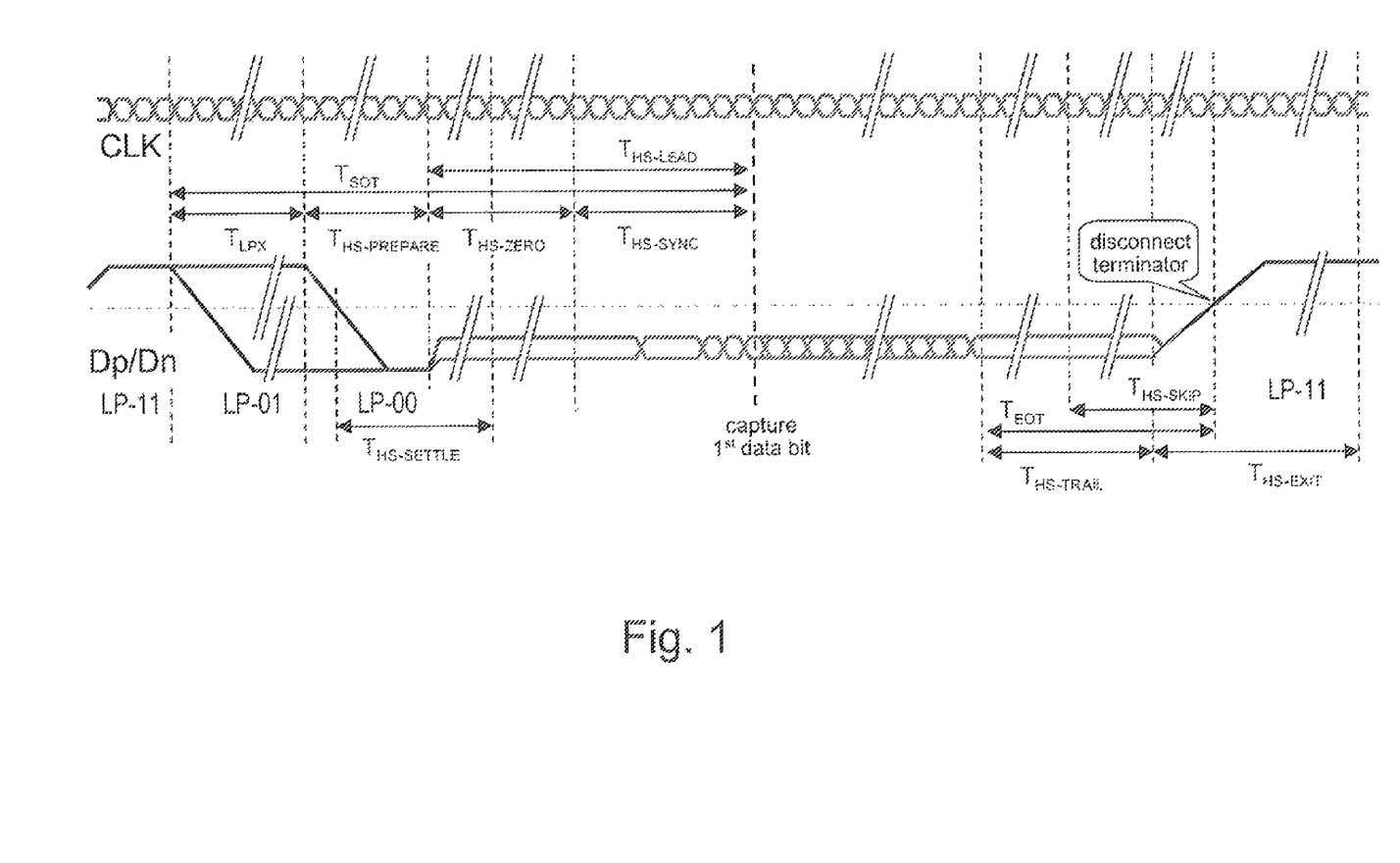
FIG. 1 shows a schematic describing line signal behaviour for the MIPI D-PHY during and around a transmission burst.
Figure 2:
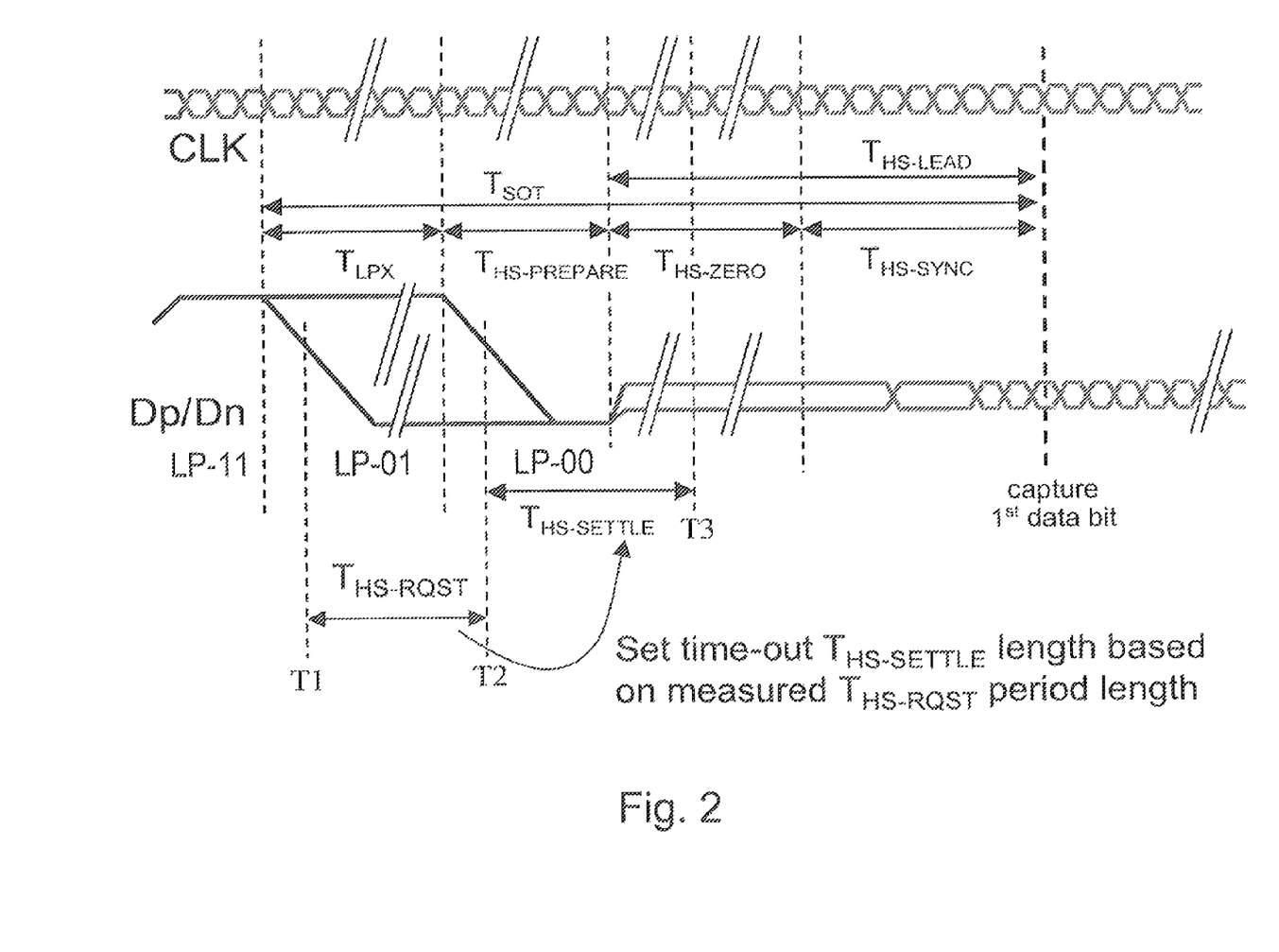
FIG. 2 represents a schematic describing line signal behaviour for the MIPI D-PHY during and around a transmission burst and incorporating the time-out generation mechanism.

The behaviour of a MIPI D-PHY transmission during a change from LP mode to HS mode will now be described with reference to FIGS. 1 and 2, which show timing diagrams of the HS clock signal CLK, the positive data signal Dp, and the negative data signal Dn.

Firstly, the data signals Dp and Dn are both raised high, during state LP-11, indicating to the receiver that LP data transmission has been completed. Then, when a change from LP mode to HS mode is required, the data signal Dp is sent low at time T1. The signals Dp and Dn are held in this state for the request time period, and then at time T2 the signal Dn is sent low. The receiver then waits for a time-out period $T_{HS\text{-}SETTLE}$, as shown in FIG. 2, during which the signals Dp and Dn settle in preparation for the HS mode.

Once the time-out period $T_{HS\text{-}SETTLE}$ has elapsed at time T3, the receiver looks for a synchronisation sequence that indicates the start of HS data transmission.

FIG. 3 shows a block diagram of a receiver 35 that comprises a digital implementation 37 of the time-out mechanism, and a decoder 36 for decoding the received signal RS. The digital implementation 37 comprises two NOR gates 31 and 32 for detecting the start and the end of the request signal; a digital counter TM1 for measuring the duration of the request period; a logic circuit CAL_TM2 for calculating the length of the time-out period based on the measured duration of the request period, a digital counter TM2 for waiting for the time-out period, and a compare circuit 37 for comparing a time-out count value calculated by the logic circuit CAL_TM2 to the count value of the digital timer TM2, and for triggering an end of time-out signal EOTO.

The digital counters TM1 and TM2 are clocked by the HS clock signal CLK, which is received within the received signal RS together with the data signal Dn and Dp. Alternatively, the digital counters TM1 and TM2 may be clocked by another clock signal that is generated within or provided to the receiver.

In use, the receiver receives the signal RS comprising signals CLK, Dp, and Dn. The signals Dp and Dn are buffered by buffers 30 and sent to the digital implementation 37 and the decoder 36. The decoder 36 initially decodes the signal Dp and Dp in a first low-power operational mode LP, until both Dp and Dn are both raised to a high level, during state LP-11 as shown in FIGS. 1 and 2. Then, when the decoder 36 receives an end-of timeout signal EOTO at time T3, the decoder starts to decode the signals Dp and Dn in a second high-speed operational mode HS.

Figure 4:
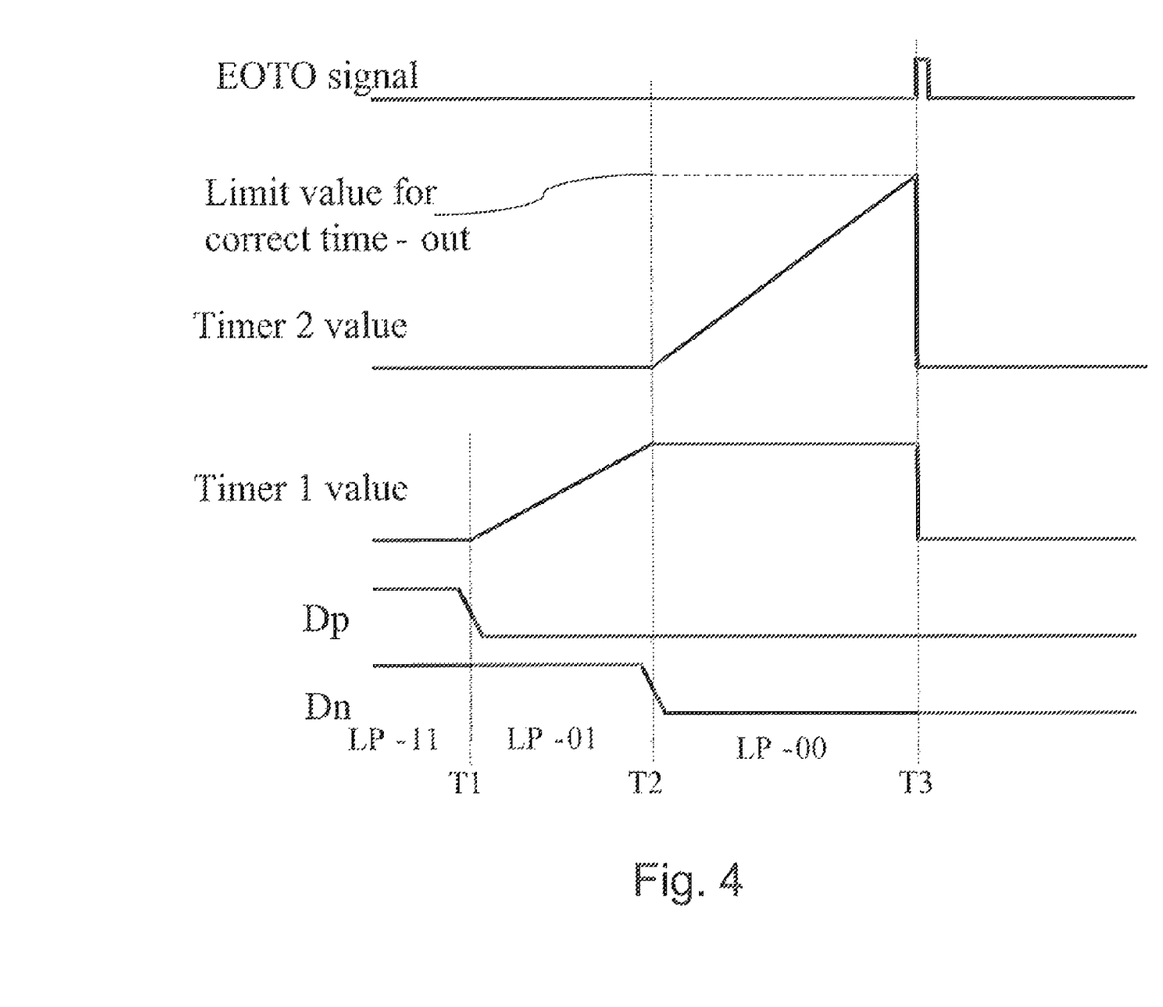
FIG. 4 represents a schematic depicting signal behaviour for the digital time-out implementation example of FIG. 3.

The operation of the digital implementation 37 will now be described with reference to the timing diagram of FIG. 4. Initially, both the signals Dp and Dn are at a high level (Dp/Dn=1/1), during state LP-11 as shown on FIG. 4. Then, at time T1, the signal Dp falls to a low level (Dp/Dn=0/1), defining the start of the request signal. The NOR gate 31 detects this 1/1 to 0/1 transition of Dp/Dn, and triggers the digital counter TM1 to start counting. Next, at time T2, the signal Dn falls to a low level (Dp/Dn=0/0), defining the end of the request signal. The NOR gate 32 detects this 0/1 to 0/0 transition of Dp/Dn, and triggers the digital counter TM2 to start counting, and also triggers the logic circuit CAL_TM2, so that it can store the count value of the digital counter TM1. The 0/1 to 0/0 transition of Dp/Dn also triggers the NOR gate 31 to stop the digital counter TM1 from counting. Hence, the count value of the digital counter TM1 represents the measured duration of the request signal.

The logic circuit CAL_TM2 then calculates a time-out count value based on the stored count value of the digital counter TM1, and the magnitude of the time-out count value represents the length of the time-out period $T_{HS\text{-}SETTLE}$. In this example, the time-out count value is chosen at 1.5 times the stored count value, thereby setting the length of the time-out period to be 1.5 times the measured duration of the request signal.

The digital counter TM2 continues to count until the compare circuit 34 determines that the count value of the digital counter TM2 has reached the time-out count value, at time T3. The compare circuit 34 then resets the digital counters TM1 and TM2, and outputs the end of time-out signal EOTO to the decoder 36, which indicates to the decoder 36 that it can start operating in the high-speed second operational mode HS.

The digital counters TM1 and TM2, the logic circuit CAL_TM2, and the compare circuit 34 only need to be enabled from the occurrence of an LP-11 to LP-01 transition at time T1, until the moment that the time-out is completed at time T3.

The receiver shown in FIG. 3 is simply one example of how a receiver according to the appended claims may be implemented. Many other alternate implementations will also be apparent to those skilled in the art.

Figure 6:
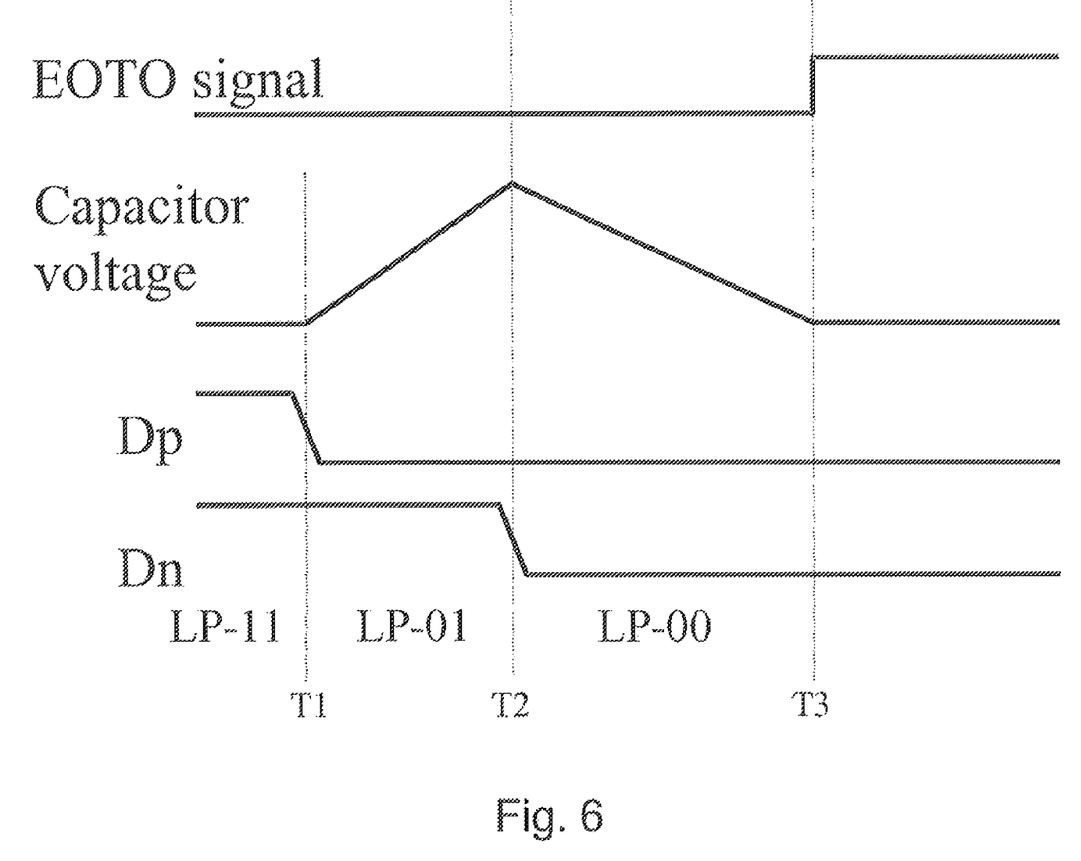
FIG. 6 represents a schematic depicting signal behaviour for the analogue time-out implementation example of FIG. 5.

An alternative analogue implementation 50 of the time-out mechanism, which can be used within the receiver 35 instead of the digital implementation 37, will now be described with reference to FIGS. 5 and 6.

The analogue implementation 50 comprises two NOR gates 31 and 32 for detecting the start and the end of the request signal; three switches SWC, SWD, and SWCAP for controlling the charging and discharging of an integrator formed by a capacitor CAP; an OP-Amp for comparing the voltages of the positive and negative terminals of the capacitor; and an AND gate 41 for generating the end of time-out signal EOTO from the OP-Amp output and the output of the NOR gate 32.

The operation of the analogue implementation 50 will now be described with reference to the timing diagram show in FIG. 6. Initially, both Dp and Dn are at a high level, causing switch SWCAP to close, and causing the NOR gates 31 and 32 output a low voltage level. The low voltage level output from the NOR gates 31 and 32 causes the switches SWC and SWD to open, and so the capacitor CAP discharges through switch SWCAP.

Then, the Dp line goes low, defining the start of the request period. This causes the switch SWCAP to open, and causes the output of the NOR gate to go high, thereby closing the switch SWC. The closure of the switch SWC causes the current source $I_{CHARGE}$ to progressively raise (integrate) the voltage stored on the capacitor CAP over time, until the Dn signal goes low at time T2, signalling the end of the request signal, and causing the switch SWC to open and the switch SWD to close.

The closure of the switch SWD causes the current source $I_{DISCHARGE}$ to progressively lower the voltage stored on the capacitor over time. Once the capacitor CAP is fully discharged at time T3, the OP-Amp transitions from a negative output to a positive output, causing the AND gate 41 to output the end of time-out signal EOTO. The non-inverting terminal of the OP Amp is held at a small positive voltage (e.g. 0.2V) by the voltage source $V_{REF}$. This ensures that the current source $I_{DISCHARGE}$ is able to discharge the capacitor enough to make the voltage of the inverting terminal fall below the voltage of the non-inverting terminal, and trigger the time-out signal EOTO.

The ratio of the current delivered by $I_{CHARGE}$ and by $I_{DISCHARGE}$ is the same as the ratio between the duration of the request signal and the length of the time-out period. Hence, the currents delivered by $I_{CHARGE}$ and $I_{DISCHARGE}$ can be modified to set the length of the time-out period $T_{HS\text{-}SETTLE}$ as a proportion of the length of the measured duration of the request signal.

Figure 7:
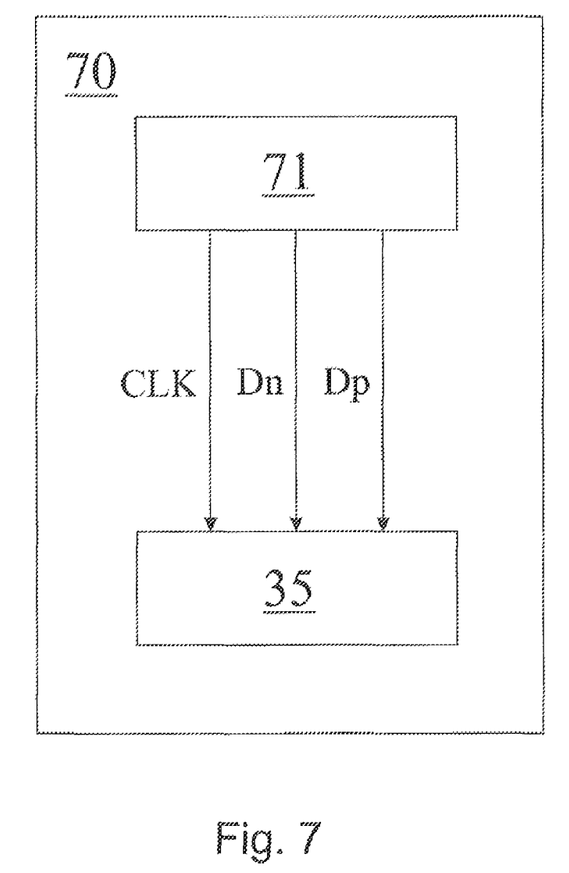
FIG. 7 shows a block diagram of a communication system incorporating the receiver of FIG. 3.

A communication system 70 comprising the receiver 35 and a transmitter 71 is shown in FIG. 7. The transmitter 71 transmits the signals Dp, and Dn, and an optional clock signal CLK as shown on FIGS. 1 and 2, to the receiver 35. The transmitter 71 and/or receiver 35 support two or more modes of operation, each with their specific line signalling characteristics for the signals Dp and Dn. In order to transition from one mode to another mode, a request signal is sent using the line signals Dp and Dn. At least one of these request signals are defined to include detectable events (levels, sequences, transitions), which can be used to measure a reference period (the duration of the request signal) that can be used to determine the length of the time-out period. The time-out period can then be exploited to ignore line events for the time-out period of time.

The communication system 70 is a source-synchronous system, and so the clock signal CLK that is sent along with the data signals Dp and Dn is needed for the data communication. However, in other systems, the clock signal CLK may a reference clock that is shared by both the transmitter and the receiver. In still further systems, the clock signal CLK may not be implemented at all, and the receiver may generate its own clock signal. In cases where a CLK signal is available, it can be exploited to help implement the time-out mechanism.

There are many ways in which the duration of the request signal can be used to determine the length of the time-out period. For example, the transmitter 71 may be set to transmit a request signal that has the same duration as the required length of the time-out signal. Alternatively, the duration of the request signal may be set as a multiple of the required time-out period. The duration of the request signal could even be set according to the instantaneous speed of the clock signal CLK. Then, the receiver could measure the duration of the request signal to determine the speed of the clock signal CLK, and then use the speed of the clock signal CLK to determine the appropriate time-out period.

Figure 8:
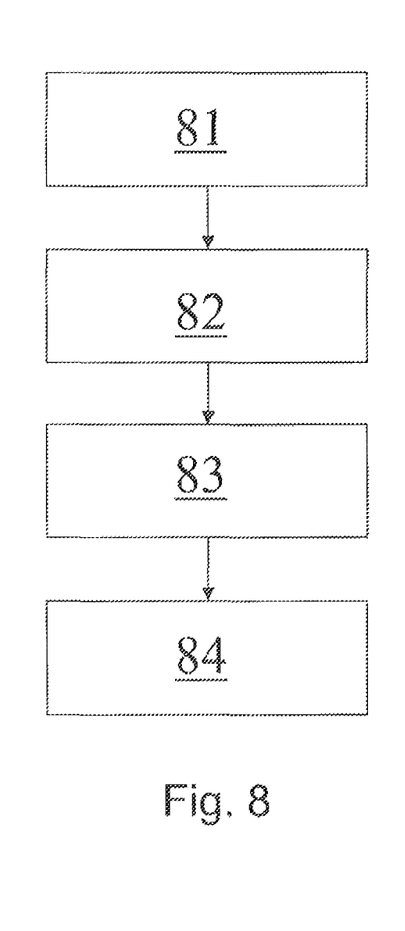
FIG. 8 shows a flow diagram of a method for determining a time-out period used for switching between a first operational mode and a second operational mode.

FIG. 8 shows a flow diagram of the method for determining the time-out period as hereinbefore described in relation to FIGS. 3 to 6. The method comprises step 81 for detecting a request signal used to request switching from the first operational mode LP to the second operational mode HS; step 82 for measuring the duration of the request signal; step 83 for determining the time-out period in dependence on the measured duration of the request signal; and step 84 for waiting for the time-out period to elapse, and starting the second operational mode.

A time-out for HS to LP switching can actually be realized in a very similar way as for the LP to HS transition. If there are two measurable indicators in the HS transmission burst with a certain reference period in between them, then a time-out can be generated after the second indicator (or if desired even after a separate third indicator). In this case the indicators may be longer code sequences, for example certain line coding symbols. However, for the particular MIPI D-PHY example described herein, the LP signals can be easily measured and interpreted, and so the need for a reference period to time the time-out period at the end of the transmission is removed, because after a single starting indicator the time-out can be sustained until the end of the time-out is observed from the LP signal transition itself.

Instead of the two above-mentioned LP and HS operation modes, there may be any two or more (different) operation modes. In this case, the determination of the time-out period may be implemented for transitions from any of these modes to any of the other modes of operation.

Although the embodiments described herein are based on the example case of MIPI D-PHY, the invention can also be used for MIPI M-PHY or any other PHY or even any other module, where a time-out is needed which is correlated to a distinguishable and measurable period, which occurs upfront. The method can therefore also be used for modules which are not intended for or used for data transmission purposes.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A receiver for receiving a signal in at least a first operational mode and a second operational mode, the receiver comprising;
    detecting means configured to detect a request signal used to request switching from the first operational mode to the second operational mode;
    measuring means configured to measure the duration of the request signal;
    determining means configured to determine a time-out period in dependence on the measured duration of the request signal; and
    waiting means configured to wait for the time-out period before the receiver operates in the second operational mode.

2. The receiver of claim 1, wherein the detecting means is configured to:
    detects the start of the request signal and triggers the measuring means to start measuring time;
    detects the end of the request signal and triggers the measuring means to stop measuring time.

3. The receiver of claim 2, wherein the measuring means comprises a digital counter that is configured to be clocked by a clock signal for the duration of the request signal.

4. The receiver of claim 2, wherein the measuring means comprises an analogue integrator that is configured to integrate for the duration of the request signal.

5. The receiver of claim 2, wherein the detecting means is configured to detect a predetermined transition in the received signal to determine the start of the request signal, and detects a further predetermined transition in the received signal to determine the end of the request signal.

6. The receiver of claim 5, wherein the measuring means comprises a digital counter that is clocked by a clock signal for the duration of the request signal.

7. The receiver of claim 6, wherein the clock signal is received within the received signal.

8. The receiver of claim 7, wherein the determining means is configured to determine the time-out period according to the request count value of the digital counter at the end of the request signal.

9. The receiver of claim 6, wherein the clock signal is configured to be generated by the receiver.

10. The receiver of claim 9, wherein the determining means is configured to determine the time-out period according to the request count value of the digital counter at the end of the request signal.

11. The receiver of claim 6, wherein the determining means is configured to determine the time-out period according to the request count value of the digital counter at the end of the request signal.

12. The receiver of claim 11, wherein the determining means comprises a logic circuit that configured to determine a time-out count value according to the request count value, and wherein the waiting means comprises a digital counter that is configured to wait for the period of time required to count to the time-out count value.

13. The receiver of claim 5, wherein the measuring means comprises an analogue integrator that is configured to integrate for the duration of the request signal.

14. The receiver of claim 13, wherein the waiting means is the same analogue integrator as the measuring means, and wherein the analogue integrator is configured to integrate in a first polarity for the duration of the request signal, and integrates in the opposite polarity to the first polarity for the timeout period.

15. The receiver of claim 14, wherein the determining means comprises a first current source configured to charge the integrator for the duration of the request signal, and a second current source configured to discharge the integrator for the time-out period; and wherein the ratio between the request period and the time-out period is determined according to the ratio between the current level of the first current source and the current level of the second current source.

16. The receiver of claim 1, wherein the first operational mode comprises a rail-to-rail swing mode, and wherein the second operational mode comprises a differential signaling mode.

17. A communication system configured to operate in at least a first operational mode and a second operational mode, the communication system comprising:
    a transmitter; and
    a receiver in accordance with claim 1.

18. A method for determining a time-out period used for switching between a first operational mode and a second operational mode of a data communications link, the method comprising:
    detecting a request signal used to request switching from the first operational mode to the second operational mode;
    measuring the duration of the request signal; and determining the time-out period in dependence on the measured duration of the request signal; and waiting for the time-out period before the receiver operates in the second operational mode.

19. A receiver for receiving a signal in at least a first operational mode and a second operational mode, the receiver comprising;

a detector configured to detect a request signal used to request switching from the first operational mode to the second operational mode;

a first counter configured to measure the duration of the request signal;

a logic circuit configured to determine a time-out period in dependence on the measured duration of the request signal; and a second counter configured to wait for the time-out period before the receiver operates in the second operational mode.

20. A communication system configured to operate in at least a first operational mode and a second operational mode, the communication system comprising:

a transmitter; and a receiver in accordance with claim 19.

* * * * *